United States Patent Office 3,634,547
Patented Jan. 11, 1972

3,634,547
THERMOPLASTIC COMPOSITIONS
John Brewster Rose, St. Albans, Carl Fraser Mathews and Eric Nield, Ware, and Peter Incledon Vincent, Welwyn Garden City, England, assignors to Imperial Chemical Industries Limited, London, England
No Drawing. Original application Apr. 4, 1966, Ser. No. 539,738. Divided and this application July 17, 1969, Ser. No. 842,709
Int. Cl. C08f 29/56, 15/40
U.S. Cl. 260—876 R          8 Claims

ABSTRACT OF THE DISCLOSURE

Graft copolymers comprising a substrate of a diene rubber and a superstrate containing a high proportion of acrylonitrile copolymerized with a vinyl ether and optionally an N-aryl maleimide.

---

This is a division of our U.S. patent application Ser. No. 539,738 filed Apr. 4, 1966, abandoned for continuation Ser. No. 860,100.

This invention relates to thermoplastic compositions derived from a diene rubber and a resin, and to the production of shaped articles therefrom.

In particular, it relates to "graft" copolymers comprising a substrate of a diene rubber and a superstrate containing a high proportion of copolymerized acrylonitrile, and to blends of such graft copolymers with polymers containing a high proportion of acrylonitrile units. The products of the invention are tough and at the same time rigid and unusually hard.

The superstrate contains a high proportion of acrylonitrile with a vinyl ether and optionally an N-aryl maleimide. The N-aryl maleimide may provide at least 1% molar of the units in the superstrate. Aromatically conjugated monomers such as styrene and α-methylstyrene are excluded from the superstrate owing to their normally inhomogeneous copolymerization with acrylonitrile. Rubber-free resins from the superstrate monomers are exceptionally strong materials with high softening points, but they are insufficiently tough for many purposes.

The superstrate contains from 45% to 90% (preferably 60% to 84%) molar of units from acrylonitrile from 0% to 20% (preferably not more than 10%) molar of units from at least one N-aryl maleimide, and from 5% to 35% (preferably 15% to 30%) molar of units from said vinyl ether.

The N-aryl maleimides are conveniently obtained from anilines (primary arylamines). Many different anilines are readily available and yield N-aryl maleimides that may be used as comonomers for the copolymers. The aryl substituent is derived from an aromatic hydrocarbon or heterocycle in which one or more of the hydrogen atoms may be replaced by other atoms or groups. Substituents containing active hydrogen atoms, however, are generally to be avoided because they may interfere with polymerizations catalyzed by free radicals. The aryl groups that may be present in the N-aryl maleimides include, for example phenyl, 4-diphenyl, 1-naphthyl, all the mono- and dimethylphenyl isomers, 2,6-diethylphenyl, 2-, 3- and 4-chlorophenyl, 4-bromophenyl and other mono- and di-halophenyl isomers, 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyl, 2-, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl and methylchlorophenyl (2,3-, 2,4-, 2,5- and 4,3- isomers). The N-(o-substituted phenyl) maleimides are generally less colored than the other isomers or the unsubstituted compounds and may therefore be preferred if a relatively colorless product is desired. The other ethylenically unsaturated monomer is vinyl ethers such as methyl and ethyl vinyl ethers.

The diene rubber in the substrate contains from 40% to 100% molar of at least one conjugated 1,3-diene monomer and from 0% to 60% of at least one other ethylenically unsaturated monomer copolymerizable with free-radical catalysts suitable dienes include for example, butadiene, isoprene, 2,3-dimethylbutadiene, piperylene and chloroprene. As comonomers acrylonitrile and styrene are particularly convenient, although a wide variety of other monomers may be used, including many of those listed above as examples of ethylenically unsaturated comonomers of the superstrate herein and in Ser. No. 539,738 the disclosure of which is incorporated herein by reference. Diene homopolymers (e.g. polybutadiene) and copolymers with a low proportion of comonomer have lower glass transition temperatures and may therefore be preferable especially when the product is required for service at low temperatures.

The compositions of the invention can be produced by a process comprising sequential polymerization. In this process, the monomers for the superstrate are polymerized by free-radical catalysis in the presence of the diene rubber. The process is carried out using the appropriate techniques for polymerizations catalyzed by free-radicals, conveniently in bulk or in aqueous suspension or emulsion. A similar emulsion process or a stereospecific process may be used to make the diene rubber. The "graft" copolymer may then be employed as a latex or isolated from the polymerization medium, freed from residual monomers, and dried. The product of this sequential polymerization may be blended if desired with a resin, e.g. a resin formed from the superstrate monomers as disclosed herein or in Ser. No. 539,738, the disclosure of which is incorporated herein by reference. This blending step can be used to produce tough and strong compositions. The grafts are therefore, according to the invention, useful materials for blending with resins to give tough compositions. The resin used for blending is not necessarily one made from the same monomers as the "grafted" portion but can be any resin of adequate strength especially one having a high content of nitrile groups. This may be for example a copolymer of acrylonitrile (45% to 90% molar, preferably 60% to 84% molar) with at least one other copolymerizable ethylenically unsaturated monomer, e.g. a homogeneous copolymer with a conjugated aromatic olefin.

A product in many ways equivalent to such a blend may also be obtained directly by adjusting the conditions of the "grafting" polymerization so that some of the superstrate monomers copolymerize to give some separate resin as well as the "graft."

The resultant products are thus composed at least partially of the type of material usually referred to as "graft copolymer." It is possible, however, that the superstrate in the "grafted" material is not all chemically bonded to the rubber but contains resin from the superstrate monomers associated with the rubber in a much more intimate physical mixture than can normally be obtained by blending preformed polymers.

The amount of rubber in the final blend is not the only factor governing toughness, which depends also on the amount of resin "grafted" on to the rubber in the "graft" used for blending.

Preferably the blend comprises from 1% to 50% by weight of the diene rubber. Compositions containing below 25% of the rubber are particularly hard scratch-resistant materials with high impact strength, and while there is an apparently smooth transition of properties the compositions containing at least 20% (preferably not more than 40%) of the rubber tend to be hard materials with very high impact strength.

Preferred blends according to the invention, unlike some rubber/resin blends, show no apparent separation of phase on warming from −180° C. to +20° C.

The compositions of the invention, mixed with any desired fillers or reinforcing materials, lubricants and stabilizers, can be used as thermoplastic raw material to make articles which require a good resistance to impact. Their toughness coupled with high strength and high softening point may thus be displayed to advantage. For example, the compositions may be extruded into sheet or tube, and the sheet can be calendered with embossing if desired or can be shaped as required, e.g. by pressing, drawing or vacuum-forming. The compositions can also be compression-molded and injection-molded. Examples of articles that may thus be produced using the compositions of the invention include panelling and exterior casing for machinery (as in motor cars, office machines and household equipment), crash helmets, pipes for conveying fluids, and telephone receivers. The use of compositions of the invention having superior tensile strength coupled with rigidity and toughness may allow economy of material in comparison with currently used products in that thinner pieces would serve the same purpose. The advantageous physical properties of the compositions may also permit them to be used in engineering applications for which plastics have not hitherto been suitable.

The toughness of a material such as a thermoplastic polymer is connected with the amount of energy that the material is capable of absorbing without breaking when stressed in tension, and this in turn is related to the way in which the material behaves when stressed in tension at different temperatures. When an increasing uniaxial tensile stress is applied at any one temperature, the material will eventually either break or yield. The material breaks before yielding if it is brittle, and whether or not it is brittle depends on the temperature. There is a temperature (the "brittle point") peculiar to any particular material above which it eventually yields under tensile stress and below which it undergoes brittle fracture. At temperatures below the brittle point, the amount of energy the material can absorb when stressed in tension is low and varies little with temperature. Above the brittle point, however, the amount of energy that can be absorbed rises steeply as the temperature increases. To be tough at room temperature, therefore, a material should have a relatively low brittle point.

The brittle points of two different materials can be compared indirectly by comparing their properties under stress, first at a low temperature where both materials are brittle, and secondly at a higher temperature where neither material is brittle. Convenient temperatures for these tests are obtained by using liquid nitrogen (the sample being at about −180° C.) and room temperature (+20° C.) respectively. Up to its brittle point, the stress at which a material breaks falls only slightly as the temperature increases. Above the brittle point, however, the stress at which the material yields falls relatively steeply as the rise of temperature continues. Consider therefore two materials which break at the same stress at −180° C. but have different brittle points. The material with the lower brittle point (the tougher material) will yield at the lower stress at +20° C. Conversely, the tougher of two different materials yielding at the same stress at +20° C. will be the one which breaks at the higher stress at −180° C.

In order to toughen a material, therefore, it is desirable to alter its composition so as to preserve a high resistance to brittle fracture at −180° C. but reduce the stress at which it yields at +20° C.

Resins containing a high proportion of homogeneously copolymerized acrylonitrile have unusually high breaking stresses at −180° C. and high yielding stresses at +20° C. According to the invention it has been found that "graft" copolymers and their blends may be produced so as largely to retain the high breaking stress at −180° C. but having a reduced yielding stress at +20° C. Owing to the high breaking stress at −180° C., the yielding stress at +20° C. can be reduced sufficiently for the product to become tough while remaining adequately rigid and hard. The invention accordingly provides materials which have a good resistance to impact coupled with excellent structural properties.

The breaking stress at −180° C. was measured on specimens 51 mm. long and 12.7 mm. wide milled from a compression-molded sheet 3 mm. thick. The specimen rested on two supports 38.1 mm. apart and midway between them a load was applied sufficient to bend the specimen at the rate of 457 mm./min. The breaking stress was calculated by multiplying the load at the moment of rupture by the factor:

$$(1.5)(38.1)/(12.7)(3)^2 = 0.5$$

The yielding stress at 20° C. was measured on specimens 76 mm. long and 14 mm. wide milled from a compression-molded sheet 3 mm. thick. The cross-sectional area across the center of the specimen was reduced to 9 mm.$^2$ by milling two slots (radius of curvature 31 mm.) opposite each other in the long edges so that the narrowest width of the specimen was 3 mm. A tensile stress was then applied to the specimen sufficient to elongate it at the rate of 12.7 mm./min. and the stress at the yield point was recorded.

For comparison with the data below, the flexural breaking stress at −180° C. of the rubber-free resins formed from the superstrate monomers is usually about 25 kg./mm.$^2$ and the tensile yielding stress is usually about 11 kg./mm.$^2$. The compositions of the invention often largely retain the high breaking stress at −180° C. characteristic of the resins but have improved toughness (as may be indicated by the greatly reduced yielding stress).

As explained above, a useful indication of the relative toughness of materials is often given by comparing their flexural breaking stresses at −180° C. and their tensile yielding stresses at +20° C. With materials that are so tough as not to be brittle in the tensile test at −40° C., however, this approach loses some of its value. An additional test (the "notched specimen impact test") has therefore been used to supplement the comparative measurements on such materials.

In this test, a specimen 60 mm. long, 6.5 mm. wide and 3 mm. thick was given at 45° notch 2.8 mm. deep (tip radius not more than 0.25 mm.) in the center of one edge. It was supported between two supports 50 mm. apart and struck centrally on the edge opposite the notch by a pendulum dropping from 30 cm. with more than sufficient energy to break the specimen. From the residual energy of the pendulum the energy required to break the specimen was calculated and divided by the cross-sectional area of the specimen at the notch. The resulting value (expressed in joules/cm.$^2$) represented the energy required to cause cracks to propagate in the material.

Using this test at room temperature (20–26° C.), various "ABS" materials broke at 0.5 j./cm.$^2$ or somewhat above. Compositions of the invention have been found to have similar "toughness" in this test. Thus compositions of the invention possess toughness in combination with exceptionally high tensile strength.

The following example illustrates the invention. "Breaking stress," "yielding stress," and "toughness" were measured as described above. Measurements were made at +20° C. (room temperature) unless otherwise indicated.

Example 1

A polybutadiene latex (189.8 g.; 70 g. solids), water (640 cm.$^3$), ammonium persulphate (1.4 g.), acrylonitrile (79.9 cm.$^3$; 1.2 mole) and ethyl vinyl ether (28.8 cm.$^3$; 0.3 mole) were added to a one-liter shaking autoclave.

Air was removed and replaced by nitrogen and the mixture was polymerized for 16 hours at 60° C. under nitrogen at 7 kg./cm.$^2$. The resulting white latex contained 16.1% solids of which 47.4% was rubber. A sample of the "graft" copolymer isolated with 0.75% aqueous calcium chloride as before gave transparent amber moldings having full and one-tenth Vicat softening points of 71° C. and 59° C. respectively and a yielding stress of 2.8 kg./mm.$^2$. The "graft" latex was blended with a latex of a homogeneously copolymerized copolymer of acrylonitrile (78% molar) and styrene (22% molar) to give a blend containing 20% rubber. When isolated, it gave translucent compression-moldings having full and one-tenth Vicat softening points of 104° C. and 94° C. respectively, a yielding stress of 6.4 kg./mm.$^2$ and a toughness of 1.84 j./cm.$^2$.

The acrylonitrile/styrene copolymer used to make the blend had, when isolated, a reduced viscosity of 0.88 at 0.5% in dimethylformamide at 25° C. and an impact strength of 4.5 j./cm.$^3$ in an unnotched specimen test. This test was carried out on a specimen 0.9 cm. wide and 0.3 cm. thick, resting horizontally (with the narrow face uppermost) against two supports 3.8 cm. apart. The specimen was struck centrally on the wider face by a horizontally moving pendulum falling from 30 cm., with more than sufficient energy to break the specimen. From the residual energy of the pendulum, the energy required to break the specimen was calculated and then divided by the effective volume (1/9 x 3.8 x 0.9 x 0.3 cm.$^3$). The resulting value (expressed in joules/cm.$^3$) represented the energy required to cause cracks to form in the material.

What is claimed is:

1. A graft copolymer comprising (i) a substrate of a diene rubber containing 40% to 100% molar of at least one conjugated 1,3-diene monomer and from 0% to 60% molar of at least one other ethylenically unsaturated monomer copolymerizable therewith using free-radical catalysts and (ii) a superstrate which consists essentially of from 45% to 90% molar of units from acrylonitrile, from 0% to 20% molar of units from at least one N-aryl maleimide wherein the aryl group is selected from the group consisting of phenyl, 4-diphenyl, 1-naphthyl, mono- and dimethylphenyl, 2,6-diethylphenyl, 2-, 3- and 4-chlorophenyl, 4-bromophenyl, 2,4,6-tribromophenyl, 4-n-butylphenyl, 2-methyl-4-n-butylphenyl, 4-benzylphenyl, 2-, 3- and 4-methoxyphenyl, 2-, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl and methylchlorophenyl and from 5% to 35% molar of units from at least one vinyl ether selected from the group consisting of methyl vinyl ether and ethylvinyl ether.

2. A graft copolymer according to claim 1 in which the superstrate contains from 60% to 84% molar of units from acrylonitrile.

3. A graft copolymer according to claim 1 in which the superstrate contains from 1% to 20% molar of units from said N-aryl maleimide.

4. A graft copolymer according to claim 1 in which the superstrate contains from 1% to 10% molar of units from said N-aryl maleimide.

5. A graft copolymer according to claim 1 in which the superstrate contains from 15% to 30% molar of units from the vinyl ether.

6. A graft copolymer according to claim 1 in which the diene rubber substrate is polybutadiene.

7. A blend of a graft copolymer according to claim 2 and a resin containing 60% to 84% molar of units from acrylonitrile, 40% to 16% molar of units from at least one ethylenically unsaturated comonomer selected from alkenes, dienes, esters of acrylic and methacrylic acids, vinyl esters, vinyl ethers, esters of fumaric acid, unsaturated nitriles, vinyl chloride vinylidene chloride and α-chloroacrylonitrile, and 0% to 20% molar of units from at least one N-aryl maleimide, wherein the aryl group is selected from the class consisting of phenyl, 4-diphenyl, 1-naphthyl, mono- and dimethylphenyl, 2,6-diethylphenyl, 2-, 3- and 4-chlorophenyl, 4-bromophenyl, 2,4,6-trichlorophenyl, 2,4,6-tribromophenyl, 4-n-butylphenyl, 2-methyl - 4 - n-butylphenyl, 4-benzylphenyl, 2-, 3- and 4-methoxyphenyl, 2-, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl and methylchlorophenyl, the blend containing from 1% to 50% by weight of rubber.

8. A blend of a graft copolymer according to claim 2 and a homogeneously copolymerized resin containing 60% to 84% molar of units from acrylonitrile, 40% to 16% molar of units from at least one conjugated aromatic olefin, and 0% to 20% molar of units from at least one N-aryl maleimide, wherein the aryl group is selected from the class consisting of phenyl, 4-diphenyl, 1-naphthyl, mono- and dimethylphenyl, 2,6-diethylphenyl, 2-, 3- and 4-chlorophenyl, 4-bromophenyl, 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyl, 2-, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl and methylchlorophenyl, the blend containing from 1% to 50% by weight of rubber.

References Cited

UNITED STATES PATENTS

| | | | |
|---|---|---|---|
| 2,901,458 | 8/1959 | Banes et al. | 260—879 X |
| 3,153,014 | 10/1964 | Fletcher et al. | 260—879 X |
| 3,265,708 | 8/1966 | Stiteler | 260—879 X |
| 3,322,852 | 5/1967 | Trementozzi et al. | 260—879 X |
| 3,432,577 | 3/1969 | Serniuk | 260—879 |
| 3,488,405 | 1/1970 | Trementozzi et al. | 260—876 |

MURRAY TILLMAN, Primary Examiner

R. W. ROBERTS, Assistant Examiner

U.S. Cl. X.R.

260—287 OP, 80.73, 85.5 R, 879